(12) United States Patent
Lee et al.

(10) Patent No.: US 10,652,615 B2
(45) Date of Patent: *May 12, 2020

(54) SYSTEM AND METHOD FOR PROVIDING INFORMATION RELATED TO AN ADVERTISEMENT INCLUDED IN A BROADCAST THROUGH A NETWORK TO A CLIENT TERMINAL

(71) Applicant: Enswers Co., Ltd., Seoul (KR)

(72) Inventors: Jaehyung Lee, Gyeonggi-do (KR); Joon-pyo Lee, Seoul (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,345

(22) Filed: Jan. 22, 2019

(65) Prior Publication Data

US 2019/0320226 A1    Oct. 17, 2019

Related U.S. Application Data

(63) Continuation of application No. 15/859,661, filed on Dec. 31, 2017, now Pat. No. 10,225,609, which is a
(Continued)

(30) Foreign Application Priority Data

Apr. 25, 2011   (KR) .......................... 10-2011-0038353

(51) Int. Cl.
*H04N 21/45* (2011.01)
*H04N 21/234* (2011.01)
(Continued)

(52) U.S. Cl.
CPC ......... *H04N 21/45* (2013.01); *H04N 5/44513* (2013.01); *H04N 21/23418* (2013.01);
(Continued)

(58) Field of Classification Search
None
See application file for complete search history.

(56) References Cited

U.S. PATENT DOCUMENTS

2002/0042914 A1 *  4/2002  Walker .................. G06Q 30/02
                                                    725/36
2002/0194604 A1   12/2002  Sanchez et al.
(Continued)

FOREIGN PATENT DOCUMENTS

EP    2012541 A1    1/2009
EP    2763427 A1    8/2014
(Continued)

*Primary Examiner* — Samira Monshi
(74) *Attorney, Agent, or Firm* — McDonnell Boehnen Hulbert & Berghoff LLP

(57) ABSTRACT

The present invention relates to a system and method for providing information related to an advertisement included in a broadcast over a network. The present invention provides a system for providing information related to an advertisement included in a broadcast to a client terminal, including a display unit, broadcast reception means and network connection means, over a network (hereinafter referred to as an "advertisement-related information provision system"), the system including a related information management unit configured to store related information corresponding to each advertisement included in a broadcast that is provided via a broadcast channel; an advertisement information identification unit configured to identify whether an advertisement stored in the related information management unit is being played during the broadcast that is provided via the broadcast channel; and a related information transmission unit configured to transmit related information, stored in the related information management unit for the advertisement identified by the advertisement information identification unit, to the client terminal over the network; wherein the client terminal includes a related
(Continued)

information display unit configured to perform control so that the received related information is displayed on the display unit, and a method using the same.

19 Claims, 5 Drawing Sheets

Related U.S. Application Data continuation of application No. 14/114,106, filed as application No. PCT/KR2011/008545 on Nov. 10, 2011, now Pat. No. 9,883,237.

(51) Int. Cl.
| | |
|---|---|
| *H04N 21/44* | (2011.01) |
| *H04N 21/658* | (2011.01) |
| *H04N 5/445* | (2011.01) |
| *H04N 21/462* | (2011.01) |
| *H04N 21/4722* | (2011.01) |
| *H04N 21/478* | (2011.01) |
| *H04N 21/4784* | (2011.01) |
| *H04N 21/81* | (2011.01) |

(52) U.S. Cl.
CPC ... *H04N 21/44008* (2013.01); *H04N 21/4622* (2013.01); *H04N 21/4722* (2013.01); *H04N 21/4784* (2013.01); *H04N 21/47815* (2013.01); *H04N 21/6582* (2013.01); *H04N 21/812* (2013.01); *H04N 2005/44521* (2013.01)

(56) References Cited

U.S. PATENT DOCUMENTS

| | | | | |
|---|---|---|---|---|
| 2008/0022296 | A1* | 1/2008 | Iggulden | H04H 60/375 |
| | | | | 725/22 |
| 2008/0244635 | A1* | 10/2008 | Pollard | G06Q 30/02 |
| | | | | 725/23 |
| 2010/0077428 | A1 | 3/2010 | Arnold et al. | |
| 2011/0313856 | A1* | 12/2011 | Cohen | G06Q 30/02 |
| | | | | 705/14.49 |
| 2012/0124619 | A1 | 5/2012 | Rowe et al. | |

FOREIGN PATENT DOCUMENTS

| | | |
|---|---|---|
| JP | 2002-132634 A | 5/2002 |
| JP | 2002-209204 A | 7/2002 |
| JP | 2004-235846 A | 8/2004 |
| JP | 2009-278315 A | 11/2009 |
| KR | 2001-0105479 A | 11/2001 |
| KR | 2007-0064842 A | 6/2007 |
| WO | WO 2007/073078 A1 | 6/2007 |
| WO | WO 2010/022000 A2 | 2/2010 |
| WO | WO 2010/103325 A2 | 9/2010 |
| WO | WO 2011/032167 A1 | 3/2011 |

* cited by examiner

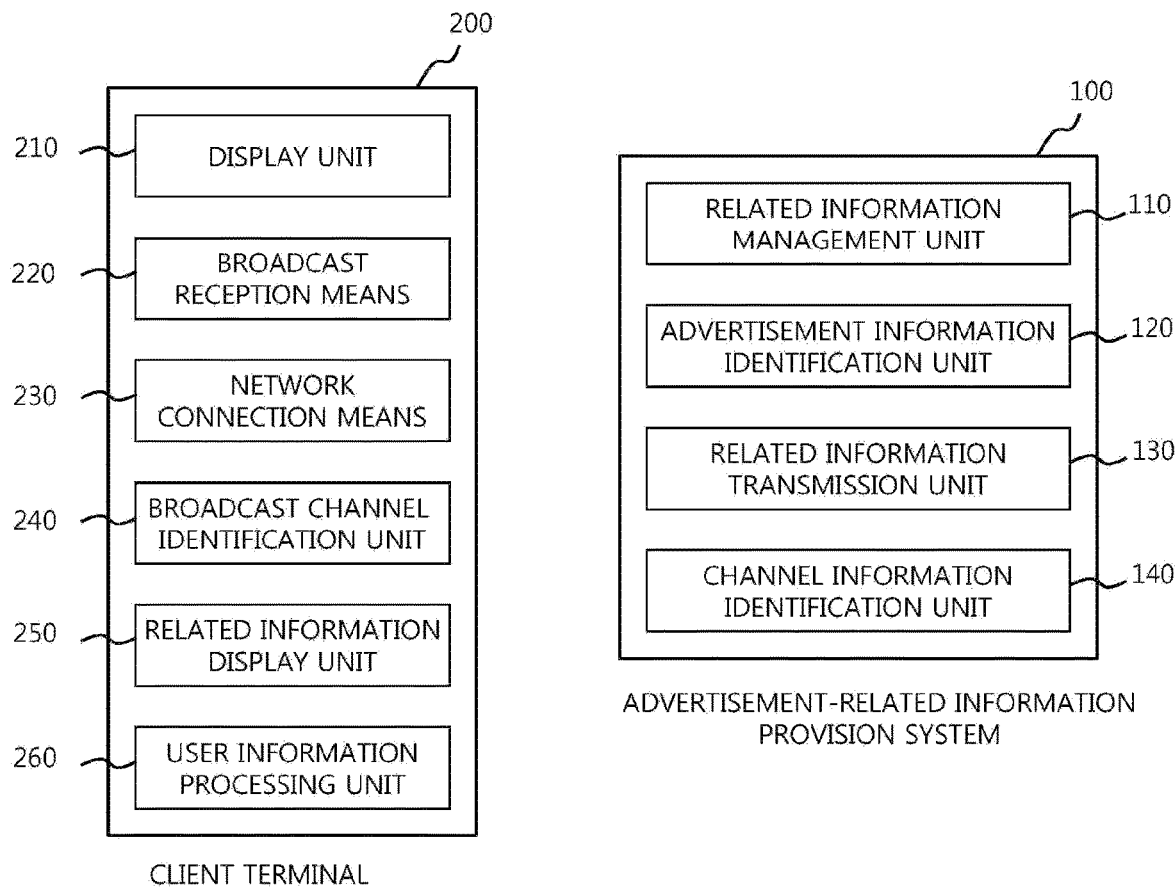

SYSTEM AND METHOD FOR PROVIDING INFORMATION RELATED TO AN ADVERTISEMENT INCLUDED IN A BROADCAST THROUGH A NETWORK TO A CLIENT TERMINAL

CROSS-REFERENCE TO RELATED APPLICATIONS

This application is a continuation of U.S. application Ser. No. 15/859,661, filed Dec. 31, 2018, which is a continuation of U.S. application Ser. No. 14/114,106, filed Jan. 6, 2014, which was the National Stage of International Application No. PCT/KR2011/008545, filed Nov. 10, 2011 and claims the benefit of Korean Patent Application No. 10-2011-0038353, filed Apr. 25, 2011, the contents of which are incorporated by reference herein in their entirety.

TECHNICAL FIELD

The present invention relates to a system and method capable of providing information related to an advertisement included in a broadcast to a client terminal and, more particularly, to a system and method that provide in real time various types of information related to an advertisement included in a broadcast to a client terminal that is playing the broadcast, over a network such as the Internet.

BACKGROUND ART

Various types of advertisements are being provided to users via broadcasts. However, such conventional general broadcast advertisements have a limit in that it is difficult to implement an advertising method that is interactive with users who are viewing a broadcast because the broadcast advertisements are provided over conventional broadcast networks, are unilateral, and have fixed content.

Meanwhile, recently, there has been proposed a device, such as a so-called smart Television (TV), which enables a network connection function or the like to be included in a device, such as a conventional TV for receiving broadcasts, and allows Internet services to be provided. Since a device, such as a smart TV, is capable of not only receiving broadcasts, but also providing Internet services and enabling applications to be downloaded, installed and executed, the device can actually be regarded as a kind of device in which a TV is integrated with a computer. Such a device having a broadcast reception function and an Internet service provision function in this way may include a mobile communication terminal having a Digital Multimedia Broadcasting (DMB) reception function and a computer for performing an Internet streaming broadcasting service, as well as a smart TV. There is a demand for the development of a new type of advertising method that is capable of encouraging users' participation while providing more satisfaction to the users, rather than the conventional unilateral advertising method, using such a device capable of simultaneously performing broadcasting and a network service.

DISCLOSURE

Technical Problem

Accordingly, an object of the present invention is to provide a system and method that are capable of providing in real time various types of related information related to an instant advertisement in which an advertisement included in a broadcast is played back to a client terminal which includes a broadcast reception means and a network connection means and which is actually playing the corresponding broadcast, while playing the broadcast.

Another object of the present invention is to provide a system and method that are capable of providing related information related to an advertisement only to a user who is actually viewing the advertisement, and thus the targeting effect of the advertisement is increased, thereby increasing not only the advertising effects of an advertisement but also the user's satisfaction.

Still another object of the present invention is to provide a system and method that are capable of separating an advertisement and advertisement-related information and providing them via separate channels, and thus an advertiser or an advertising service provider can conveniently and easily change the related information related to the advertisement, thereby improving advertising effects.

A further object of the present invention is to provide a system and method that enable a user who receives related information related to an advertisement to carry out an additional operation, and thus secondary consumer interaction activities, such as purchasing and information acquisition, can be increased by the advertisement, thereby increasing advertising effects by encouraging the user's interactive participation.

A still further object of the present invention is to provide a system and method that is capable of accurately determining in real time whether an advertisement is being played by using fingerprint information and that is capable of accurately determining the channel identification information of a client terminal, thereby being able to provide a more elaborate and accurate advertisement.

Technical Solution

In order to accomplish the above objects, the present invention provides a system for providing information related to an advertisement included in a broadcast to a client terminal, including a display unit, broadcast reception means and network connection means, over a network (hereinafter referred to as an "advertisement-related information provision system"), the system including a related information management unit configured to store related information corresponding to each advertisement included in a broadcast that is provided via a broadcast channel; an advertisement information identification unit configured to identify whether an advertisement stored in the related information management unit is being played during the broadcast that is provided via the broadcast channel; and a related information transmission unit configured to transmit related information, stored in the related information management unit for the advertisement identified by the advertisement information identification unit, to the client terminal over the network; wherein the client terminal includes a related information display unit configured to perform control so that the received related information is displayed on the display unit.

Here, the client terminal further may include a broadcast channel identification unit configured to acquire channel identification information of the broadcast that the client terminal is receiving, using the broadcast reception means. The broadcast channel identification unit of the client terminal may request the identification of the broadcast channel by extracting fingerprint information based on at least one of audio, video, or a combination thereof from the broadcast received via the broadcast reception means and then transmitting the extracted fingerprint information to a channel information identification server; the channel information identification server may identify channel information of the broadcast that the client terminal is currently receiving by extracting fingerprint information based on at least one of audio, video, or a combination thereof from the broadcast provided via the broadcast channel and then comparing the extracted fingerprint information with the fingerprint information received from the broadcast channel identification unit of the client terminal, and transmit the identified channel information to the client terminal; and the broadcast channel identification unit of the client terminal may acquire the channel identification information of the broadcast that the client terminal is receiving based on the channel information of the broadcast received from the channel information identification server.

The related information transmission unit may transmit the channel identification information of the broadcast in which the advertisement identified by the advertisement information identification unit is being displayed, together with the related information, to the client terminal; and the related information display unit of the client terminal may display the related information on the display unit if the received channel identification information of the broadcast is identical to the channel identification information of the broadcast acquired by the broadcast channel identification unit.

The broadcast channel identification unit of the client terminal may transmit the channel identification information of the broadcast to the related information transmission unit; and the related information transmission unit of the advertisement-related information provision system may identify the client terminal that is playing the advertisement identified by the advertisement information identification unit based on the channel identification information of the broadcast received from the client terminal, and transmit the related information stored in the related information management unit to the identified client terminal over the network.

The related information transmission unit of the system may transmit a broadcast channel identification request signal, used to identify whether the identified advertisement is being played, to the client terminal; and the broadcast channel identification unit of the client terminal may transmit the broadcast channel identification information to the related information transmission unit in response to the broadcast channel identification request signal.

The channel information identification server may be included in the advertisement-related information provision system.

The related information management unit may store fingerprint information based on at least one of audio, video, or a combination thereof previously extracted from the advertisement included in the broadcast provided via the broadcast channel, together with the related information, in relation to the advertisement; and the advertisement information identification unit may identify whether the advertisement stored in the related information management unit is being played by extracting fingerprint information based on at least one of audio, video, or a combination thereof from the broadcast provided via the broadcast channel and then comparing the extracted fingerprint information with the fingerprint information previously stored in the related information management unit for each advertisement.

The related information display unit of the client terminal may display the received related information on the display unit so that the received related information is overlaid on a broadcast picture that is currently being received.

The related information display unit of the client terminal may display the received related information on a portion of the display unit so that the received related information is not overlaid on a broadcast picture that is currently being received.

The client terminal may further include a user information processing unit configured to receive a user input signal based on the displayed related information and to transmit an additional operation request signal based on the received input signal to the system or an external separate device.

The broadcast channel identification unit of the client terminal may transmit time information, together with the fingerprint information, to the channel information identification server; and the channel information identification server may acquire time offset information of broadcast pictures of the client terminal and the advertisement-related provision system by comparing absolute time information of the advertisement-related provision system with the time information transmitted from the client terminal, and transmit the acquired time offset information to the client terminal.

The related information transmission unit may transmit the absolute time information, together with the related information, to the client terminal; and the client terminal may display the related information based on the received absolute time information and the time offset information of the broadcast pictures.

In accordance with another aspect of the present invention, there is provided a method of providing advertisement-related information to a client terminal, including a display unit, broadcast reception means and network connection means, in a system for providing information related to an advertisement included in a broadcast over a network, the method including step 1 of identifying whether a previously stored advertisement is being played during a broadcast that is provided via a broadcast channel; and step 2 of transmitting related information, previously stored for the identified advertisement, to the client terminal over the network; wherein the client terminal displays the received related information on the display unit.

Here, the method may further include the step of acquiring, by the client terminal, channel identification information of the broadcast that the client terminal is receiving, using the broadcast reception means.

Acquiring the channel identification information of the broadcast may include the client terminal requesting identification of the broadcast channel by extracting fingerprint information based on at least one of audio, video, or a combination thereof from the broadcast received via the broadcast reception means and transmitting the extracted fingerprint information to a channel information identification server; the channel information identification server identifying channel information of the broadcast that the client terminal is currently receiving by extracting fingerprint information based on at least one of audio, video, or a combination thereof from the broadcast provided via the broadcast channel and then comparing the extracted fingerprint information with the fingerprint information received from the client terminal, and transmitting the identified channel information to the client terminal; and the client terminal acquiring the channel identification information of the broadcast that the client terminal is receiving based on the channel information of the broadcast received from the channel information identification server.

Step 2 may include transmitting the channel identification information of the broadcast in which the identified advertisement is being displayed, together with the related information, to the client terminal; and the client terminal may display the related information on the display unit if the received channel identification information of the broadcast is identical to the channel identification information of the broadcast acquired by the broadcast channel identification unit.

The method may further include, before step 2, step 1-1 of acquiring, by the client terminal, the channel identification information of the broadcast that the client terminal is receiving, and transmitting, by the client terminal, the channel identification information of the broadcast to the advertisement-related information provision system; and step 2 may include identifying the client terminal that is playing the identified advertisement based on the channel identification information of the broadcast received from the client terminal at step 1-1, and transmitting the related information to the identified client terminal over the network.

Step 1-1 may be performed in response to a broadcast channel identification request signal that is used to identify whether the identified advertisement is being played and that is transmitted from the advertisement-related information provision system to the client terminal connected to the advertisement-related information provision system.

The channel information identification server may be included in the advertisement-related information provision system.

The advertisement-related information provision system may store fingerprint information based on at least one of audio, video, or a combination thereof previously extracted from the advertisement included in the broadcast provided via the broadcast channel, together with the related information, in relation to the advertisement; and step 1 may include identifying whether the stored advertisement is being played by extracting fingerprint information based on at least one of audio, video, or a combination thereof from the broadcast provided via the broadcast channel and then comparing the extracted fingerprint information with the fingerprint information previously stored in the related information management unit for each advertisement.

After step 2, the client terminal may display the received related information on the display unit so that the received related information is overlaid on a broadcast picture that is currently being received.

After step 2, the client terminal may display the received related information on a portion of the display unit so that the received related information is not overlaid on a broadcast picture that is currently being received.

The method may further include, after step 2, the step of receiving, by the client terminal, a user input signal based on the displayed related information, and transmitting, by the client terminal, an additional operation request signal based on the received input signal to the system or an external separate device.

The client terminal may transmit time information, together with the fingerprint information, to the channel information identification server, and the channel information identification server may acquire time offset information of broadcast pictures of the client terminal and the advertisement-related provision system by comparing absolute time information of the advertisement-related provision system with the time information transmitted from the client terminal, and transmit the acquired time offset information to the client terminal.

The advertisement-related provision system may transmit the absolute time information, together with the related information, to the client terminal, and the client terminal may display the related information based on the received absolute time information and the time offset information of the broadcast pictures.

Advantageous Effects

In accordance with the present invention, there can be provided a system and method that are capable of providing in real time various types of related information related to an instant advertisement in which an advertisement included in a broadcast is played back to a client terminal which includes a broadcast reception means and a network connection means and which is actually playing the corresponding broadcast, while playing the broadcast.

Furthermore, the present invention can provide a system and method that are capable of providing related information related to an advertisement only to a user who is actually viewing the advertisement, and thus the targeting effect of the advertisement is increased, thereby increasing not only the advertising effects of an advertisement but also the user's satisfaction.

Furthermore, the present invention can provide a system and method that are capable of separating an advertisement and advertisement-related information and providing them via separate channels, and thus an advertiser or an advertising service provider can conveniently and easily change the related information related to the advertisement, thereby improving advertising effects.

Furthermore, in accordance with the present invention, there can be provided a system and method that enable a user who receives related information related to an advertisement to carry out an additional operation, and thus secondary consumer interaction activities, such as purchasing and information acquisition, can be increased by the advertisement, thereby increasing advertising effects by encouraging the user's interactive participation.

Furthermore, in accordance with the present invention, there can be provided a system and method that is capable of accurately determining in real time whether an advertisement is being played by using fingerprint information and that is capable of accurately determining the channel identification information of a client terminal, thereby being able to provide a more elaborate and accurate advertisement.

DESCRIPTION OF DRAWINGS

FIG. 2 is a diagram illustrating the internal configurations of a system 100 for providing related information and a client terminal 200 according to an embodiment of the present invention;

FIG. 3 is a diagram illustrating examples of related information and fingerprint information related to each advertisement stored in a related information management unit 110;

BEST MODE

Embodiments of the present invention will be described in detail below with reference to the attached drawings.

Figure 1:
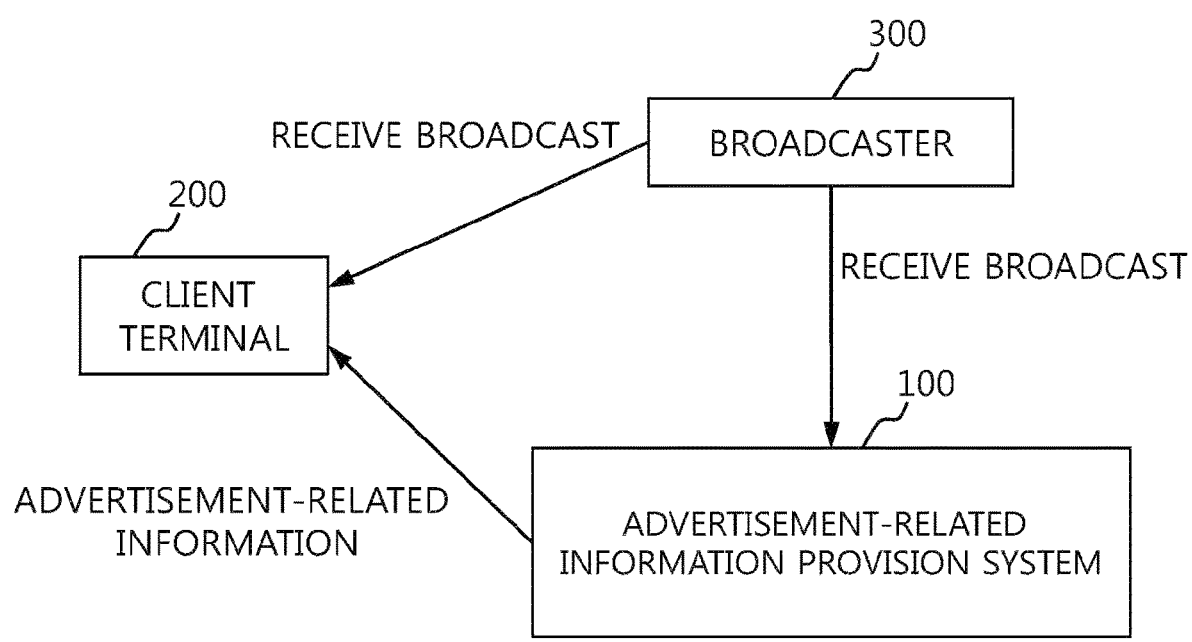
FIG. 1 is a diagram illustrating a system for providing information related to an advertisement included in a broadcast to a client terminal according to the present invention and an overall environment in which the present invention may be implemented.

FIG. 1 is a diagram illustrating a system for providing information related to an advertisement included in a broadcast to a client terminal according to the present invention and an overall environment in which the present invention may be implemented.

Referring to FIG. 1, a system for providing information related to an advertisement included in a broadcast according to the present invention (hereinafter referred to as the "advertisement-related information provision system 100") is connected to a client terminal 200 over a network, and receives a broadcast from a broadcaster 300. Here, the term "network" includes a concept, such as the Internet, or a mobile communication network. The advertisement-related information provision system 100 identifies an advertisement included in a broadcast while receiving the broadcast from the broadcaster 300, and provides related information previously stored in relation to the advertisement to the client terminal 200 over the network.

The broadcaster 300 denotes any of service providers that provide all types of broadcasts generally called a broadcast in the current environment, for example, a terrestrial broadcaster such as a typical broadcasting station, a cable TV service provider, a Digital Multimedia Broadcasting (DMB) service provider, and an Internet TV service provider. In FIG. 1, although the broadcaster 300 has been illustrated as being a single component for convenience of description, it is apparent that a plurality of broadcasters may be present.

The client terminal 200 receives broadcasts provided by the broadcaster 300, and is provided with related information related to an advertisement included in a broadcast being received by the client terminal 200 via the advertisement-related information provision system 100 and the network. Furthermore, since the client terminal 200 receives broadcasts and is connected to the advertisement-related information provision system 100 over the network, it includes a broadcast reception means capable of receiving broadcasts and a network connection means. Furthermore, the client terminal 200 includes a display unit, for example, a Liquid Crystal Display (LCD) device, which can display the received broadcasts. Such a client terminal 200 may be a "smart television (Smart TV)", which is a device that is widely sold these days. The term "smart TV" denotes a TV in which a network connection means, such as a wireless Local Area Network (LAN) module, is provided in a typical TV, and a program(application), such as a web browser, is executable, thus allowing a user to surf the web or to download and execute an application on the TV. Furthermore, the client terminal 200 may be a mobile communication terminal having, for example, a DMB reception function. Since recent mobile communication terminals have a wireless LAN connection function, such a wireless LAN connection function and a DMB reception function can be regarded as network connection means and a broadcast reception means, respectively. Furthermore, the client terminal 200 may be physically implemented using a plurality of devices rather than a single device, in which the client terminal 200 may be implemented using, for example, a typical TV and a set-top box that is connected to the typical TV and that is configured to implement the function of the above-described smart TV. Such a set-top box is an auxiliary device enabling the function of a smart TV to be implemented using an existing typical TV without having to separately purchase a smart TV. For example, devices, such as Apple's Apple TV and Google's Google TV, have been released onto the market and, in addition, such a set-top box has recently been widely sold in other various forms. In this way, the client terminal 200 can be used in the present invention without being changed, regardless of the type of client terminal, as long as the client terminal is provided with a broadcast reception means and a network connection means.

The overall operation of the present invention implemented in such an environment will be summarized and described in brief below.

First, the client terminal 200 receives a broadcast from the broadcaster 300 via the broadcast reception means. The advertisement-related information provision system 100 also receives a broadcast from the broadcaster 300. When an advertisement is included in a broadcast during the reception of the broadcast, the advertisement-related information provision system 100 identifies the advertisement and transmits related information previously stored in relation to the advertisement to the client terminal 200 which is receiving the broadcast, and the client terminal 200 receives the information and displays the information on the display unit.

Detailed embodiments of the present invention will be described in detail below with reference to the drawings from FIG. 2.

FIG. 2 is a diagram illustrating the internal configurations of the advertisement-related information provision system 100 and the client terminal 200 according to a preferred embodiment of the present invention.

Referring to FIG. 2, the advertisement-related information provision system 100 includes a related information management unit 110, an advertisement information identification unit 120, a related information transmission unit 130, and a channel information identification unit 140. As described in conjunction with FIG. 1, since the advertisement-related information provision system 100 receives a broadcast from the broadcaster 300, the advertisement-related information provision system 100 includes a broadcast reception means, but this configuration is apparent from the conventional art, and so it should be noted that the illustration of the broadcast reception means and general components related thereto is omitted.

The related information management unit 110 functions to store in advance related information related to each advertisement included in a broadcast provided via a broadcast channel. Here, the broadcast channel may be one or more channels, and the related information management unit 110 stores in advance related information related to each advertisement included in broadcasts being provided by the broadcaster 300 via the broadcast channels. Here, the related information refers to various types of information related to a corresponding product, such as discount coupon information for the corresponding advertising product, various types of information about purchases, information about websites on which the product can be viewed, and event information. It is preferred that the related information may be input or edited by an advertiser or an adverting service provider (not shown), so that the advertiser or the adverting service provider may conveniently change the information related to a corresponding advertisement as desired. Meanwhile, when necessary, the related information management unit 110 may further include other additional data, such as description information about each advertisement or an identifier uniquely assigned to identify each advertisement.

Further, the related information management unit 110 may extract fingerprint information based on at least one of audio, video, and a combination thereof, from each advertisement, and may store the extracted fingerprint information together with the related information in relation to the advertisement included in a broadcast.

Here, the "fingerprint information" denotes feature data indicating the features of data, such as audio data or video data, and is also referred to as "fingerprint data," "deoxyribonucleic acid (DNA) data," or gene data. With regard to such fingerprint information, various schemes based on the prior art are proposed. By using such fingerprint information, it can be easily determined whether pieces of data are identical, and thus such fingerprint information has recently been widely used in Digital Rights Management (DRM) fields or the like. For example, in the case of audio data, fingerprint information can be generated using various types of feature data representing the features of audio data (e.g., frequency, amplitude, etc.), and in the case of video data, fingerprint information can be generated using various types of feature data representing the features of video data (e.g., the motion vector information, color information, etc. of frames). An object of the present invention is not a method itself of generating such fingerprint information, and any type of conventional fingerprint generation/extraction method can be used without change in the present invention, and thus a detailed description thereof will be omitted here. In accordance with Korean Patent Application No. 10-2007-0044251 (entitled "Method and apparatus for generating audio fingerprint data and method and apparatus for comparing audio data using the same"), Korean Patent Application No. 10-2007-0054601 (entitled "Method and apparatus for determining identicalness of video data and detecting an identical section"), Korean Patent Application No. 10-2007-0060978 (entitled "Method and apparatus for clustering pieces of video data having identicalness among pieces of video data"), Korean Patent Application No. 10-2007-0071633 (entitled "Method and apparatus for providing a video data search service using video data clusters"), Korean Patent Application No. 10-2007-0091587 (entitled "Method and apparatus for setting and providing advertisement data using video data clusters"), and Korean Patent Application No. 10-2008-0051688 (entitled "Video processing method and apparatus"), which are filed by the present applicant, methods of generating the fingerprint data of audio or video data and clustering methods using such fingerprint data are described, and it is apparent that the fingerprint generation and extraction methods, filed by the present applicant, can also be applied to the present invention. In summary, the present invention may use conventional well-known fingerprint generation/extraction technology without change, regardless of which type of fingerprint information extraction scheme has been used.

The fingerprint information stored for each advertisement by the related information management unit 110 is used by the related information transmission unit 120, which will be described later, to determine whether an advertisement stored in the related information management unit 110 is being played during a broadcast. Although it will be described later, the advertisement information identification unit 120 continuously extracts fingerprint information based on at least one of audio, video, and a combination thereof for the corresponding broadcast in real time, for example, at regular intervals, while continuously monitoring broadcasts provided via a plurality of broadcast channels in real time, and compares the extracted fingerprint information with the fingerprint information stored in the related information management unit 110, as described above, thus determining whether any one of broadcast advertisements stored in the related information management unit 110 is being broadcasted. Of course, it is possible to determine whether an advertisement is being played during a broadcast by using information other than the fingerprint information, but, as described above, it is preferable to use the fingerprint information because the fingerprint information clearly represents the unique features of audio or video data.

FIG. 3 is a diagram illustrating examples of related information and fingerprint information for each advertisement stored in the related information management unit 110.

Referring to FIG. 3, it can be seen that a brief description of each advertisement is included in an advertisement field, and an identifier uniquely assigned to each advertisement is included in an advertisement identifier field. As the related information, information, such as "provision of 5% discount coupon" and "link to www.ccc.com," is included. Although in FIG. 3, for the convenience of description, the content of related information, rather than actual related information, are illustrated briefly, it is preferable to include, in an actual implementation, data that enables a user on the client terminal side to be actually provided with related information having such content of related information.

For example, in the case of "provision of 5% discount coupon," related information may be configured to include a webpage implemented using a combination of text, audio, or video data which allows the user to be actually provided with such details, thus enabling the webpage as the actual related information to be provided to the client terminal. In this case, the related information may be configured to include the webpage.

As another example, in the case of "link to www.ccc.com," a webpage containing a hyperlink may be stored as the related information so as to perform the corresponding operation.

In addition, it is apparent that the related information may also be configured using simple text data in such a way that the text data is provided to the client terminal. As will be described later, the client terminal 200 receives the related information from the advertisement-related information provision system 100 and displays it on the display unit, so that the related information is preferably data that is defined to be able to perform such processing.

In the last field of FIG. 3, fingerprint information related to each advertisement is represented by binary numbers. As described above, by using fingerprint information, the advertisement information identification unit 120 may determine whether an advertisement included in the related information management unit 110 is being broadcasted. The fingerprint information may include fingerprint information for all frames of video data when the corresponding advertisement is, for example, video data. Since the advertisement information identification unit 120 must detect in real time that an advertisement is started when the advertisement is started during a broadcast, the fingerprint information may be configured to include fingerprint information corresponding to a section from the first frame of the corresponding advertisement to a last frame within a predetermined interval.

Referring back to FIG. 2, the advertisement information identification unit 120 of the advertisement-related information provision system 100 will be described. The advertisement information identification unit 120 functions to identify whether an advertisement stored in the related information management unit 110 is being played during a broadcast provided via a broadcast channel, as described above.

As described above, this may be performed such that the advertisement information identification unit 120 continuously extracts in real time fingerprint information based on at least one of audio, video, and a combination thereof for each broadcast provided through each broadcast channel, compares the extracted fingerprint information with the fingerprint information for each advertisement previously stored in the related information management unit 110, and then identifies whether an advertisement stored in the related information management unit 110 is being played in the broadcast.

The advertisement information identification unit 120 must determine whether the advertisement is being played within a very short time period from a time point at which the corresponding advertisement starts. The reason for this is that an advertisement is generally terminated within a relatively short time, such as 20 seconds, 30 seconds, or 1 minute, that the related information is provided to the client terminal 200 during that time, as will be described later, and that a request for an additional operation must be processed when the request for an additional operation based on the related information is received from the client terminal 200.

Therefore, the advertisement information identification unit 120 preferably extracts fingerprint information about the audio or video data of a broadcast picture at relatively short time intervals. When the advertisement information identification unit 120 identifies that an advertisement is included in a broadcast picture, that is, an advertisement is being played in a broadcast picture using the above method, the advertisement information identification unit 120 notifies the related information transmission unit 130 of the results of the identification together with information about a corresponding channel.

The related information transmission unit 130 functions to search for related information stored in the related information management unit 110 for the identified advertisement by the advertisement information identification unit 120, as described above, and also functions to transmit the searched related information to the client terminal 200 over the network. In this case, the related information must be displayed on the client terminal 200 only that is playing the broadcast in which the identified advertisement is included among the client terminal 200 connected to the advertisement-related information provision system 100. This will be performed as below.

First, the client terminal 200 is provided with a broadcast channel identification unit 240 (see FIG. 2) for obtaining broadcast channel identification information for the broadcast channel through which the client terminal 200 is receiving a broadcast with a broadcast reception means 220, and may determine whether to display related information, by using the broadcast channel identification information acquired by the broadcast channel identification unit 240.

For this purpose, the related information transmission unit 130 of the advertisement-related information provision system 100 transmits broadcast channel identification information indicative of the broadcast channel including the identified advertisement while transmitting the related information. And the related information display unit 250 of the client terminal 200 may compare the broadcast channel identification information acquired by the broadcast channel identification unit 240 with the broadcast channel identification information received from the advertisement-related information provision system 100, and may display the corresponding related information on the display unit 210 if the pieces of channel identification information are identical to each other. If the pieces of channel identification information are not identical, the related information display unit 250 ignores the received related information.

For example, when the client terminal 200 is a smart TV and is playing a terrestrial digital broadcast on a "Seoul Broadcasting System (SBS)" channel, such channel information is provided to the client terminal 200 through digital broadcast signals, and thus the broadcast channel identification unit 240 of the client terminal 200 can obtain broadcast channel identification information from the channel information and digital broadcast signals. The broadcast channel identification unit 240 preferably updates broadcast channel identification information periodically or when a channel is changed, or.

Meanwhile, when the client terminal 200 does not identify broadcast channel, broadcast channel identification information can be acquired using fingerprint information. That is, the broadcast channel extraction unit 240 is provided with a function of extracting the above-described fingerprint information, and the fingerprint information about the broadcast being received by the client terminal 200 is continuously extracted in real time and is transmitted to a channel information identification server (not shown). Then, the channel information identification server checks the broadcast channel identification information of the client terminal 200 and transmits it to the client terminal 200. By this, the client terminal 200 can obtain the broadcast channel identification information.

The channel information identification server functions to extract fingerprint information in real time from all broadcasts provided by the broadcaster 300 using the above-described method, to compare the extracted fingerprint information with the fingerprint information received from the broadcast channel identification unit 240 of the client terminal 200, to identify the channel information of the broadcast which the client terminal 200 is currently receiving, and to transmit the channel information to the client terminal 200.

Since the channel information identification server has fingerprint information for all broadcast channels in real time, it can compare the fingerprint information with the fingerprint information received from the broadcast channel identification unit 240 of the client terminal 200, and can exactly determine a broadcast channel through which the broadcast is being played on the client terminal 200.

In this way, when the channel information of the broadcast being received by the client terminal 200 is identified by the channel information identification server, the identified broadcast channel information is transmitted to the client terminal 200, and the broadcast channel identification unit 240 of the client terminal 200 can obtain identification information about the broadcast channel through which the broadcast is being played thereby.

Meanwhile, although the channel information identification server may be a device physically separate from the advertisement-related information provision system 100, it is apparent that the channel information identification server may be configured to be included in the advertisement-related information provision system 100, as illustrated as the channel information identification unit 140 in FIG. 2.

Next, a second method in which related information is displayed only on the client terminal 200 that is playing the identified advertisement among the client terminals connected to the system 100 will be described.

The second method denotes a scheme in which the advertisement-related information provision system 100 first receives broadcast channel identification information from the client terminal 200, identifies a client terminal 200 that is playing the identified advertisement, and transmits related information only to the identified client terminal 200.

For this purpose, the client terminal 200 may acquire identification information about the broadcast channel, via which the broadcast is currently being received and played, using the above-described broadcast channel identification unit 240, and may transmit the broadcast channel identification information to the advertisement-related information provision system 100. In this case, the broadcast channel identification unit 240 may automatically transmit the identification information about the broadcast channel via which the broadcast is currently being received to the advertisement-related information provision system 100, or, alternatively, transmit the identification information about the broadcast channel via which the broadcast is currently being received to the advertisement-related information provision system 100 in response to a broadcast channel identification request signal which is received from the advertisement-related information provision system 100.

Meanwhile, the broadcast channel identification unit 240 of the client terminal 200 may transmit time information together while transmitting the fingerprint information to the channel information identification server. This is for a case where there is a time difference between time points at which the client terminal 200 and the advertisement-related information provision system 100 receive the same broadcast picture in the procedure of receiving actual broadcast pictures.

For this purpose, as described above, the broadcast channel identification unit 240 of the client terminal 200 transmits its time information (which can be acquired by a clock typically embedded in a client terminal) together while transmitting the fingerprint information to the channel information identification server. Then, the channel information identification server can obtain a time difference, that is, a time offset, between the client terminal 200 and the advertisement-related information provision system 100 for the same picture by comparing the time information of the client terminal 200 with the time information of the advertisement-related information provision system 100 while identifying the channel information of the client terminal 200 based on the fingerprint information, as described above.

Here, if the channel information identification server is implemented as a separate device from the advertisement-related information provision system 100, the server and the system are preferably set such that they are synchronized with each other. When the channel information identification server is implemented in the advertisement-related information provision system 100, like the channel information identification unit 140 of FIG. 2, it can be considered that the channel information identification server is synchronized with the advertisement-related information provision system 100.

Meanwhile, it is preferable to use absolute time information, for example, Greenwich Mean Time (GMT), as the time information of the advertisement-related information provision system 100. The channel information identification server may compare the absolute time information with the time information received from the client terminal 200 while comparing fingerprint information, and then determine a time difference, that is, time offset information, for the same picture. If the time offset information has been acquired, the channel information identification server transmits the time offset information to the client terminal 200. The time offset information can be transmitted together with the channel information.

Once the time offset information has been acquired, the related information transmission unit 130 transmits the absolute time information together with the related information stored in the related information management unit 110 to the client terminal 200 that is currently playing the advertisement identified by the advertisement information identification unit 120. Then, the client terminal 200 that received the absolute time information and the related information may display the related information on the display unit of the client terminal 200 on the basis of the time offset information.

Next, the client terminal 200 will be described below.

The client terminal 200 includes the display unit 210, the broadcast reception means 220, a network connection means 230, the related information display unit 250, and a user information processing unit 260. As described in conjunction with FIG. 1, the client terminal 200 has the function of receiving broadcasts provided in various forms, and the function of connecting to a network, such as the Internet, and may be, for example, a smart TV, a mobile communication terminal having a DMB reception function, or an Internet Protocol (IP) TV (IPTV). Among the components of the client terminal 200, the display unit 210, the broadcast reception means 220, and the network connection means 230 are well known in the conventional art, and thus a detailed description thereof will be omitted.

The broadcast channel identification unit 240 is a means for obtaining identification information about a broadcast channel via which a broadcast is received through the broadcast reception means. Since this has been described in detail above, a detailed description thereof will be omitted.

The related information display unit 250 functions to perform control so that the related information received from the related information transmission unit 130 of the advertisement-related information provision system 100 is displayed on the display unit 210.

As described above, the related information display unit 250 may receive the broadcast channel identification information, together with the related-information, from the advertisement-related information provision system 100, may determine whether the received broadcast channel is identical to a broadcast channel via which the broadcast is currently being played, and may display the corresponding related information only when the broadcast channels are identical to each other.

As another method, when related information is received only for the client terminal 200 that is currently playing the corresponding advertisement from the advertisement-related information provision system 100, as described above, the related information display unit 250 displays the related information on the display unit 210 while receiving the related information. In this case, the related information display unit 250 may display the related information based on time offset information, as described above.

Meanwhile, methods for displaying related information on the display unit 210 by the related information display unit 250 may be implemented in various forms. First, the received related information may be displayed so that it is overlaid on a broadcast picture currently being received on the display unit 210. For example, the related information may be displayed while being overlaid on a broadcast picture appearing in a lower portion of the display unit 210.

The related information here may be data that enables the details of the related information to be actually executed, as described in conjunction with FIG. 3. For example, in the case of "provision of 5% discount coupon," this is displayed as text data for a predetermined period of time so that the details of the data can be executed, and a method of allowing the user to be provided with the corresponding coupon, for example, a hyperlink, is provided to the user, with the result that information enabling the hyperlink to be selected can be continuously displayed while being overlaid on the broadcast picture.

Further, the related information displayed on the broadcast picture can be provided in the form of, for example, a flashing or scrolling form.

Meanwhile, the related information display unit 250 may be configured to partially display the received related information so that it is not overlaid on the broadcast picture currently being received, on the display unit 210. For example, this may be provided using a method by which the related information is provided in a lower portion of the screen in the form of a bar, and a broadcast picture is displayed to be reduced by the size of the area in which related information is provided.

Meanwhile, the user information processing unit 260 of the client terminal 200 functions to receive the user input signal based on the related information displayed as described above, and to transmit an additional operation request signal based on the received input signal to the advertisement-related information provision system 100 or a separate external device.

As described above, when the related information unilaterally provides only information to the client terminal 200, the user information processing unit 260 may be omitted, but there are cases where some related information may prompt the user to perform a specific operation. For example, there may be some cases where the user is prompted to conduct an additional operation, such as accessing a specific site or sending a text message to a specific phone number, in order to be provided with information, such as "the provision of 5% discount coupon" as related information. When the user of the client terminal 200 enters an additional operation request signal in response to the request signal, the user information processing unit 260 functions to receive the additional operation request signal and transmit it to the advertisement-related information provision system 100 or a separate external device (e.g., a specific website). For this purpose, the client terminal 200 preferably has an input means (e.g., a keyboard, a mouse, and a remote control) allowing the user to enter an input signal.

Figure 4:
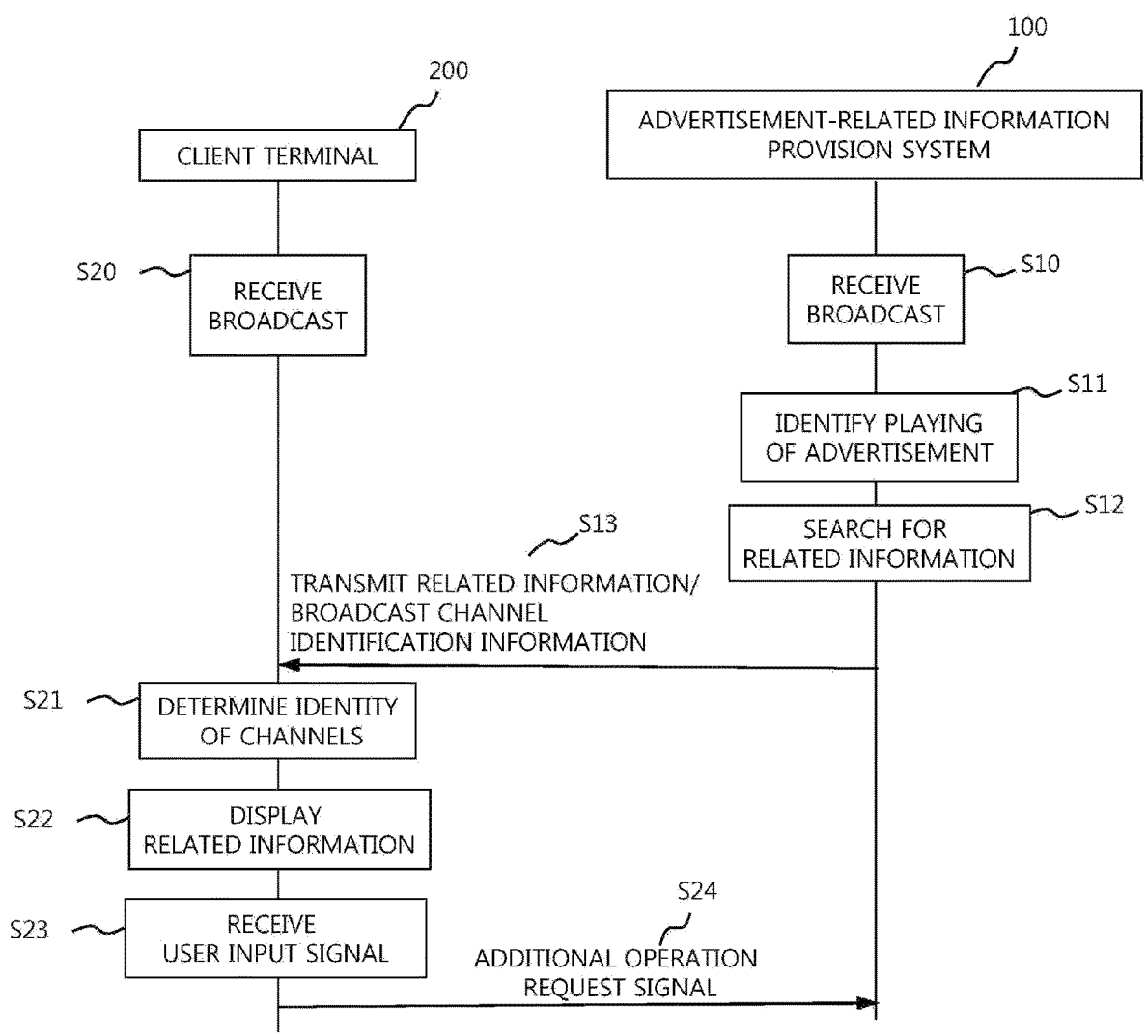
FIG. 4 is a flowchart illustrating an embodiment of a method of providing related information to the client terminal 200 using the advertisement-related information provision system 100 according to the present invention.

FIG. 4 is a flowchart illustrating an embodiment of a method of providing related information to the client terminal 200 using the above-described advertisement-related information provision system 100.

First, as described above, the client terminal 200 and the advertisement-related information provision system 100 receive a broadcast from the broadcaster 300, as described in conjunction with FIG. 1, at steps S10 and S20.

As described above, the advertisement-related information provision system 100 previously stores corresponding related information for each advertisement included in broadcasts provided via broadcast channels in the related information management unit 110, and identifies whether an advertisement stored in the related information management unit 110 is currently being played during each broadcast using the advertisement information identification unit 120 while receiving a plurality of broadcasts via a plurality of broadcast channels from one or more broadcasters 300 at step S11.

Here, as described above, the determination of whether the stored advertisement is being played may be performed using a method in which fingerprint information based on at least one of audio, video, and a combination thereof, which are previously extracted from each advertisement included in a broadcast included in each broadcast provided through each broadcast channel, is stored together with the related information in the related information management unit 110 in relation to each advertisement, and in which the advertisement information identification unit 120 extracts fingerprint information based on at least one of audio, video, and a combination thereof from a broadcast provided via the broadcast channel, compares the extracted fingerprint information with the fingerprint information about each advertisement included in a broadcast previously stored in the related information management unit 110, and then identifies whether the advertisement stored in the related information management unit 110 is being played.

Once the advertisement has been identified, the related information transmission unit 130 searches for related information stored in the related information management unit 110 in relation to the corresponding advertisement of the advertisement-related information provision system 100 at step S12, and the related information transmission unit 130 transmits the searched related information and broadcast channel identification information to all of the connected client terminals 100 at step S13.

Next, the client terminal 200, after receiving the related information and the broadcast channel identification information, determines whether the received broadcast channel identification information of the advertisement-related information provision system 100 is identical to the broadcast channel identification information acquired by the broadcast channel identification unit 240 by comparing the pieces of information at step S21, and displays the related information on the display unit if the pieces of information are identical to each other at step S22.

In this case, the related information is displayed using a method of being overlaid on a broadcast picture or not being overlaid on a broadcast picture, as described above. For step S21, as described above, the client terminal 200 may directly acquire channel identification information broadcast using the broadcast channel identification unit 240, or may acquire the channel identification information of the broadcast that it is playing, via the channel information identification server.

When the related information is displayed, an additional operation request signal may be generated by the client terminal based on the related information. An input signal is received from the user based on the related information displayed on the client terminal 200 at step S23, and the additional operation request signal based on the received input signal is transmitted to the advertisement-related information provision system 100 or a separate external device at step S23. Although in FIG. 4, the additional operation request signal is illustrated as being transmitted only to the advertisement-related information provision system 100, it is apparent that the additional operation request signal may also be transmitted to a separate external device.

Since the most of FIG. 4 are identical to that described in conjunction with FIGS. 1 to 3, a detailed description thereof is omitted, and it should be noted that only important operating features partly have been schematically described in FIG. 4.

Figure 5:
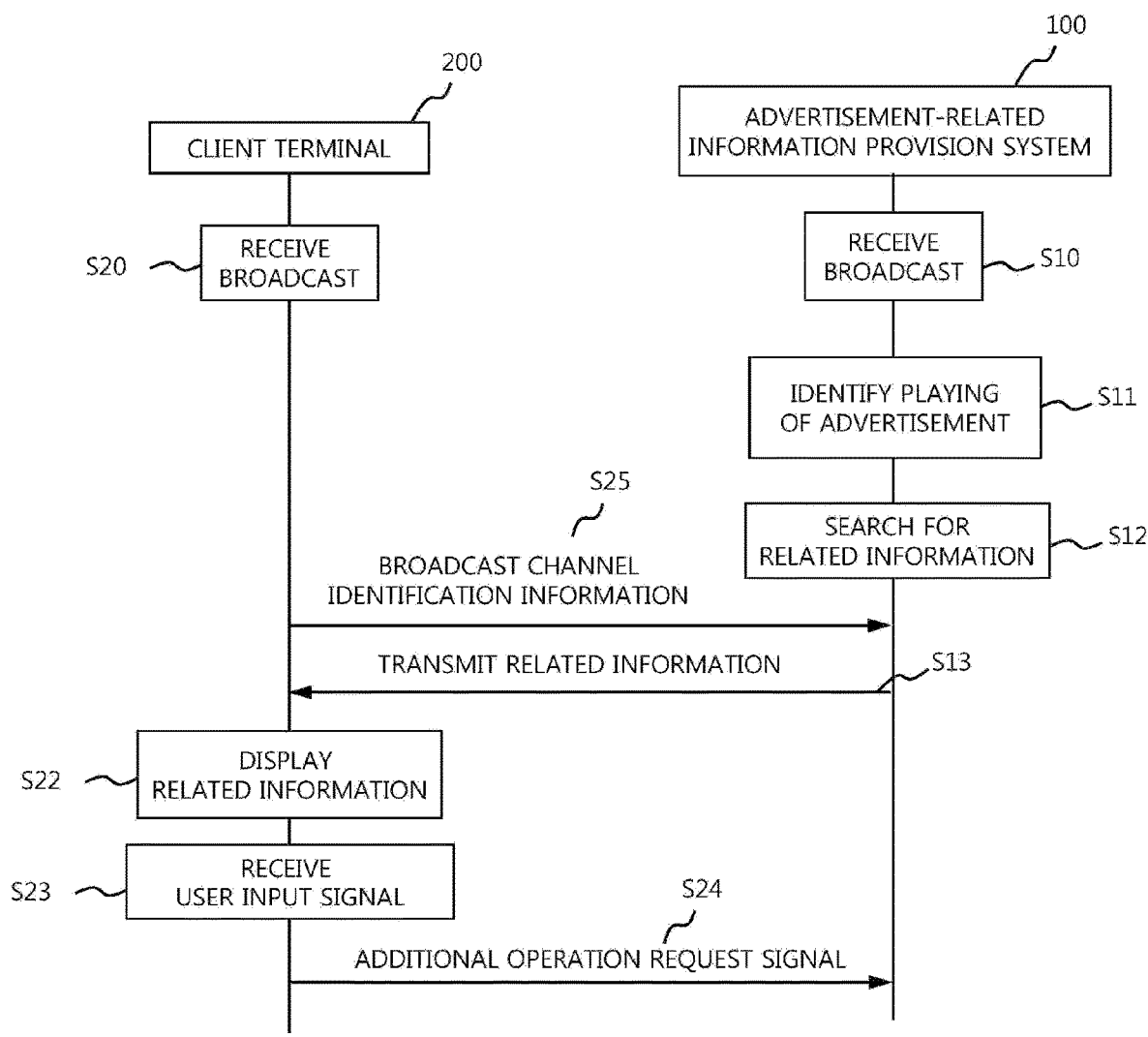
FIG. 5 is a flowchart illustrating another embodiment of a method of providing related information to the client terminal 200 using the advertisement-related information provision system 100 according to the present invention.

FIG. 5 is a flowchart illustrating another embodiment of a method of providing related information to the client terminal 200 using the advertisement-related information provision system 100 according to the present invention. Compared to the case of FIG. 4, the embodiment of FIG. 5 shows a case where related information is transmitted only to a client terminal 200 which is playing an identified advertisement without being transmitted to all client terminals to which the advertisement-related information provision system 100 is connected.

Since steps S10, S11, S12, and S20 are identical to those of FIG. 4, a detailed description thereof will be omitted here. After step S12, the client terminal 200 transmits broadcast channel identification information to the advertisement-related information provision system 100 at step S27. Although in FIG. 5, for the convenience of description, step S27 is illustrated as being performed after step S12, step S25 may not necessarily performed at that time.

As described above, when the client terminal 200 knows information about a broadcast channel via which it is receiving and playing a broadcast, it can transmit the information as broadcast channel identification information to the advertisement-related information provision system 100. This can be implemented using a method by which transmission is performed, for example, either periodically at regular periods, or whenever a change in channel is performed by the client terminal 200.

Through the above procedure, the advertisement-related information provision system 100 can know information about a channel via which each client terminal 100 connected to the system is currently receiving, that is, playing, a broadcast. Accordingly, a client terminal 100 on which an advertisement identified by the advertisement information identification unit 120 is being played can be specified. The related information transmission unit 130 transmits the found related information to the corresponding client terminal 100 based on the specified information at step S13. Here, this step is different from step S13 of FIG. 4 in that broadcast channel identification information is not included.

Next, the client terminal 200, after receiving the related information, displays the received related information on the display unit 210 at step 22, and then performs steps S22 and S24. Since steps S22 and S24 are identical to those of FIG. 4, a detailed description thereof will be omitted. However, step S21 of FIG. 4 is not performed because the broadcast channel identification information is not required.

Figure 6:
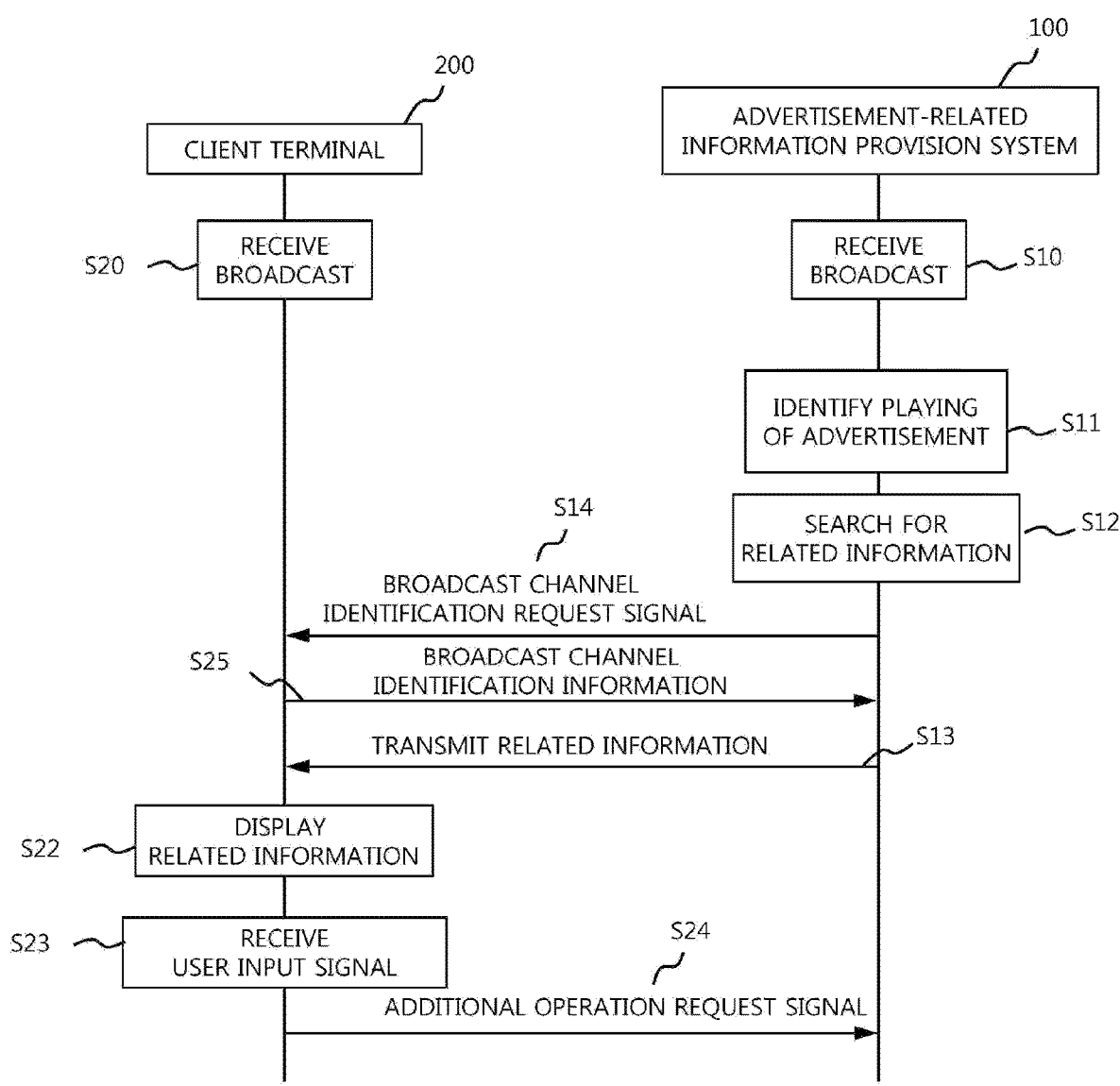
FIG. 6 is a flowchart illustrating still another embodiment of a method of providing related information to the client terminal 200 using the advertisement-related information provision system 100 according to the present invention.

FIG. 6 is a flowchart illustrating a further embodiment of a method of providing related information to the client terminal 200 using the advertisement-related information provision system 100 according to the present invention.

Comparing FIG. 6 with FIG. 5, FIG. 6 is different only in that after steps S11 and S12 at which the advertisement-related information provision system 100 has identified whether the stored advertisement is being played and has searched for the related information, the related information transmission unit 130 transmits a broadcast channel identification request signal, required to determine whether the identified advertisement is being played, to the client terminal 200 connected to the advertisement-related information provision system 100 at step S14, and the client terminal 200 transmits broadcast channel identification information in response to the request signal at step S25.

That is, in the case of FIG. 6, there is a difference in that broadcast channel identification information is transmitted only when a broadcast channel identification request signal is received, rather than the case of FIG. 5 in which the client terminal 200 first transmits the channel information of a broadcast which it is receiving and playing to the advertisement-related information provision system 100. Other procedures are similar to those of FIG. 5, and thus a detailed description thereof will be omitted.

As described above, although the present invention has been described in conjunction with the preferred embodiments of the present invention, it is apparent that the present invention is not limited by the above embodiments, and various modifications and changes are possible in various forms. For example, the client terminal 200 may be any type of terminal having a broadcast reception means and a network connection means, and may also include a computer, a tablet PC, or a mobile communication terminal which receives broadcasts provided over the Internet, as well as the above-described smart TV and a mobile communication terminal having a DMB reception function. Further, the concept of broadcasts may include not only a typical broadcast form, but also any type of real-time streaming service, such as a broadcast of a soccer game provided over the Internet or, moreover, Video On Demand (VOD).

The invention claimed is:

1. A client terminal, comprising:
   a display device;
   a broadcast reception device configured to receive a broadcast;
   a network connection device communicatively coupling the client terminal to a network;
   memory storing one or more programs; and
   one or more processors configured by the one or more programs to perform operations comprising:
      receiving the broadcast via a broadcast channel, wherein the broadcast is separately and simultaneously provided to an advertisement-related information provision system and the client terminal;
      determining first channel identification information relating to the broadcast channel of the broadcast that is currently being played by the client terminal;
      receiving, from the advertisement-related information provision system via the network, related information together with second channel identification information, wherein the related information is related to an advertisement, wherein the second channel identification information relates to a broadcast channel on which the advertisement-related information provision system determined the advertisement is being played, wherein the related information is received separately from the broadcast;
      determining that the first channel identification is identical to the second channel identification information; and
      responsive to determining that the first channel identification is identical to the second channel identification information, displaying the related information on the display device.

2. The client terminal of claim 1, wherein determining the first channel identification information comprises acquiring, by the client terminal, the first channel identification information from a signal for the broadcast received via the broadcast reception device.

3. The client terminal of claim 1, wherein determining the first channel identification information comprises:
   extracting, from the broadcast, fingerprint information based on at least one of audio or video of the broadcast;
   transmitting the extracted fingerprint information to a channel information identification server; and
   receiving the first channel identification information from the channel information identification server.

4. The client terminal of claim 3, wherein the operations further comprise:
   transmitting, from the client terminal to a channel information identification server, time information with the fingerprint information; and
   receiving, from the channel information identification server, a time offset relating to a difference between a timing of the client terminal and a timing of the advertisement information provision system,
   wherein displaying the related information comprises displaying the related information based on the time offset.

5. The client terminal of claim 3, wherein extracting the fingerprint information comprises extracting, from the broadcast, fingerprint information based on the video of the broadcast.

6. The client terminal of claim 1, wherein displaying the related information on the display device comprises overlaying the related information on video of the broadcast.

7. A non-transitory machine-readable medium having instructions embodied thereon, which when executed by a client terminal with one or more processors, cause the client terminal to perform operations comprising:
   receiving a broadcast via a broadcast channel, wherein the broadcast is separately and simultaneously provided to an advertisement-related information provision system and the client terminal, wherein the client terminal comprises a broadcast reception device for receiving the broadcast;
   determining first channel identification information relating to the broadcast channel of the broadcast that is currently being played by the client terminal;
   receiving, from the advertisement-related information provision system via a network, related information together with second channel identification information, wherein the related information is related to an advertisement, wherein the second channel identification information relates to a broadcast channel on which the advertisement-related information provision system determined the advertisement is being played, wherein the related information is received via a network connection device of the client terminal separately from the broadcast,
   determining that the first channel identification is identical to the second channel identification information; and
   responsive to determining that the first channel identification is identical to the second channel identification information, causing a display device of the client terminal to display the related information.

8. The non-transitory machine-readable medium of claim 7, wherein determining the first channel identification information comprises acquiring, by the client terminal, the first channel identification information from a signal for the broadcast received via the broadcast reception device.

9. The non-transitory machine-readable medium of claim 7, wherein determining the first channel identification information comprises:
   extracting, from the broadcast, fingerprint information based on at least one of audio or video of the broadcast;
   transmitting the extracted fingerprint information to a channel information identification server; and
   receiving the first channel identification information from the channel information identification server.

10. The non-transitory machine-readable medium of claim 9, wherein the operations further comprise:
    transmitting, from the client terminal to a channel information identification server, time information with the fingerprint information; and
    receiving, from the channel information identification server, a time offset relating to a difference between a timing of the client terminal and a timing of the advertisement information provision system,
    wherein displaying the related information comprises displaying the related information based on the time offset.

11. The non-transitory machine-readable medium of claim 9, wherein extracting the fingerprint information comprises extracting, from the broadcast, fingerprint information based on the video of the broadcast.

12. The non-transitory machine-readable medium of claim 7, wherein displaying the related information on the display device comprises overlaying the related information on video of the broadcast.

13. A method for obtaining information related to an advertisement in a broadcast, wherein a client terminal includes a display device, a broadcast reception device for receiving the broadcast, and a network connection device for communicatively coupling the client terminal to a network, the method comprising:
    receiving, by the client terminal, a broadcast via a broadcast channel, wherein the broadcast is separately and simultaneously provided to an advertisement-related information provision system and the client terminal;
    determining, by the client terminal, first channel identification information relating to the broadcast channel of the broadcast that is currently being played by the client terminal;
    transmitting, from the client terminal to the advertisement-related information provision system via the network, the first channel identification information relating to the broadcast channel of the broadcast that is being played by the client terminal; and
    responsive to the advertisement-related information provision system determining, based on the first channel identification information, that the client terminal is playing the advertisement:
       receiving, by the client terminal from the advertisement-related information provision system via the network, related information related to the advertisement, wherein the related information is received separately from the broadcast, and
       responsive to receiving the related information, displaying the related information on the display device,
    wherein the advertisement-related information provision system stores reference fingerprint information previously extracted from the advertisement together with the related information for the advertisement, and
    wherein the advertisement-related information provision system is configured to determine, based on the first channel identification information, that the client terminal is playing the advertisement by:
       (i) receiving the broadcast via the broadcast channel,
       (ii) determining that the advertisement is being played during the broadcast by:
          extracting, from the broadcast, fingerprint information based on at least one of audio or video of the broadcast, and
          comparing the extracted fingerprint information with the reference fingerprint information for the advertisement previously stored in the advertisement-related information provision system, (iii) determining, by the advertisement-related information provision system, second channel identification information relating to the broadcast channel on which the advertisement is being played, (iv) receiving, by the advertisement-related information provision system from the client terminal, the first channel identification information relating to a broadcast channel of the broadcast that is being played by the client terminal, and (v) determining, by the advertisement-related information provision system, that client terminal is playing the advertisement based on the first channel identification information and the second channel identification information.

14. The method of claim 13, wherein determining the first channel identification information comprises acquiring, by the client terminal, the first channel identification information from a signal for the broadcast received via the broadcast reception device.

15. The method of claim 13, wherein determining the first channel identification information comprises:
extracting, from the broadcast, fingerprint information based on at least one of audio or video of the broadcast;
transmitting the extracted fingerprint information to a channel information identification server; and
receiving the first channel identification information from the channel information identification server.

16. The method of claim 15, further comprising:
transmitting, from the client terminal to a channel information identification server, time information with the fingerprint information; and
receiving, from the channel information identification server, a time offset relating to a difference between a timing of the client terminal and a timing of the advertisement information provision system,
wherein displaying the related information comprises displaying the related information based on the time offset.

17. The method of claim 15, wherein extracting the fingerprint information comprises extracting, from the broadcast, fingerprint information based on the video of the broadcast.

18. The method of claim 13, wherein displaying the related information on the display device comprises overlaying the related information on video of the broadcast.

19. The method of claim 13, further comprising:
receiving, by the client terminal, a user input signal based on the displayed related information; and
transmitting, by the client terminal, an additional operation request signal based on the user input signal to the advertisement-related information provision system.

* * * * *